Oct. 8, 1957        B. O. LUTMAN, JR        2,808,922

CONVEYOR CONTROL SYSTEM

Filed Feb. 17, 1955        3 Sheets-Sheet 1

Fig. 1

INVENTOR.
BYRON O. LUTMAN, JR.

BY Woodling and Krost,
attys.

Oct. 8, 1957   B. O. LUTMAN, JR   2,808,922
CONVEYOR CONTROL SYSTEM
Filed Feb. 17, 1955   3 Sheets-Sheet 2

Fig. 2

INVENTOR.
BYRON O. LUTMAN, JR.
BY
Woodling and Krost,
attys.

Oct. 8, 1957  B. O. LUTMAN, JR  2,808,922
CONVEYOR CONTROL SYSTEM
Filed Feb. 17, 1955  3 Sheets-Sheet 3

Fig. 3

INVENTOR.
BYRON O. LUTMAN, JR.
BY
Woodling and Krost,
attys.

United States Patent Office 2,808,922
Patented Oct. 8, 1957

2,808,922
CONVEYOR CONTROL SYSTEM

Byron O. Lutman, Jr., Detroit, Mich., assignor to The Reliance Electric & Engineering Company, a corporation of Ohio Application February 17, 1955, Serial No. 488,850

17 Claims. (Cl. 198—82)

The invention relates in general to electrical control systems and more particularly to systems which may be used to control the rate of movement of machinery, for example, a conveyor, so that a desired linear speed is attained and which system may also be used to synchronize movement of a second conveyor with the first conveyor.

Increasingly, conveyors are being used in factories, especially on assembly lines, to convey manufactured units in a route through a factory wherein parts are added to the unit or work is performed on the unit until it becomes a final finished product. These conveyors are widely used in the automotive industry, for example, wherein parts which eventually become the finished automobile are added to a unit being conveyed along the assembly conveyor. Because this assembly procedure is complex, many conveyors connected in series are often used with the units being transferred from one conveyor to another at transfer points. It is exceedingly important to achieve a high rate of flow of units on the conveyors in order to achieve maximum production in keeping with the available labor supply working on the units on the assembly line and to maintain a uniform production despite temporary shutdowns caused by overloads, jamming of units on the conveyor, the conveyor chain jumping the track, and so forth. When one conveyor is temporarily shut down, it is important to shut down all other conveyors preceding such conveyor so that units will not pile up or be dumped off the conveyor at the transfer points. Also, when the trouble is corrected, it is important to slightly increase the speed of the conveyor in order to maintain a certain number of units on the conveyor passing a fixed station per unit of time, for example, per hour.

Therefore, an object of the invention is to provide a conveyor control system which is highly flexible and which will control a master conveyor at a desired rate of speed and control other conveyors in the same system at speeds in accordance with the speed of the master conveyor and/or master timer.

Another object of the invention is to synchronize two conveyors wherein units are transferred from one conveyor to the second at a transfer point so that the linear speed of units on the two conveyors are synchronized.

Still another object of the invention is to provide means to synchronize first and second conveyors meeting at a transfer point so that should the two conveyors get out of synchronism for any reason beyond a certain preset amount, one conveyor will be changed in speed to correct the out of synchronism condition; and if this change in speed is still insufficient and the conveyors become still more out of synchronism, one or both of the conveyors will be shut down so that the maximum out of synchronism condition at which units may be transferred from one conveyor to the other will not be exceeded.

Still another object of the invention is to provide a master timer which controls the speed of a first conveyor and also controls the speed of another conveyor and which utilizes an electrical differential which electrically compares the speed of the master timer with the actual speed of a conveyor so as to give an electrical output for out of synchronous conditions and which electrical output will cause mechanical movement to close a switch which through suitable control mechanism corrects the out of synchronous condition.

Still another object of the invention is to provide a control system for a conveyor wherein both a position and a speed regulating system are incorporated to correct for relative position of two conveyors as well as to correct for relative speed of two conveyors.

Still another object of the invention is to provide switch contacts which give a relatively large change of resistance in a motor control system to give position correction and to provide a motor operated rheostat which gives relatively slow change for a speed regulation in a conveyor control system.

Other objects and a fuller understanding of this invention may be had by referring to the following description and claims, taken in conjunction with the accompanying drawings, in which:

Figure 1:
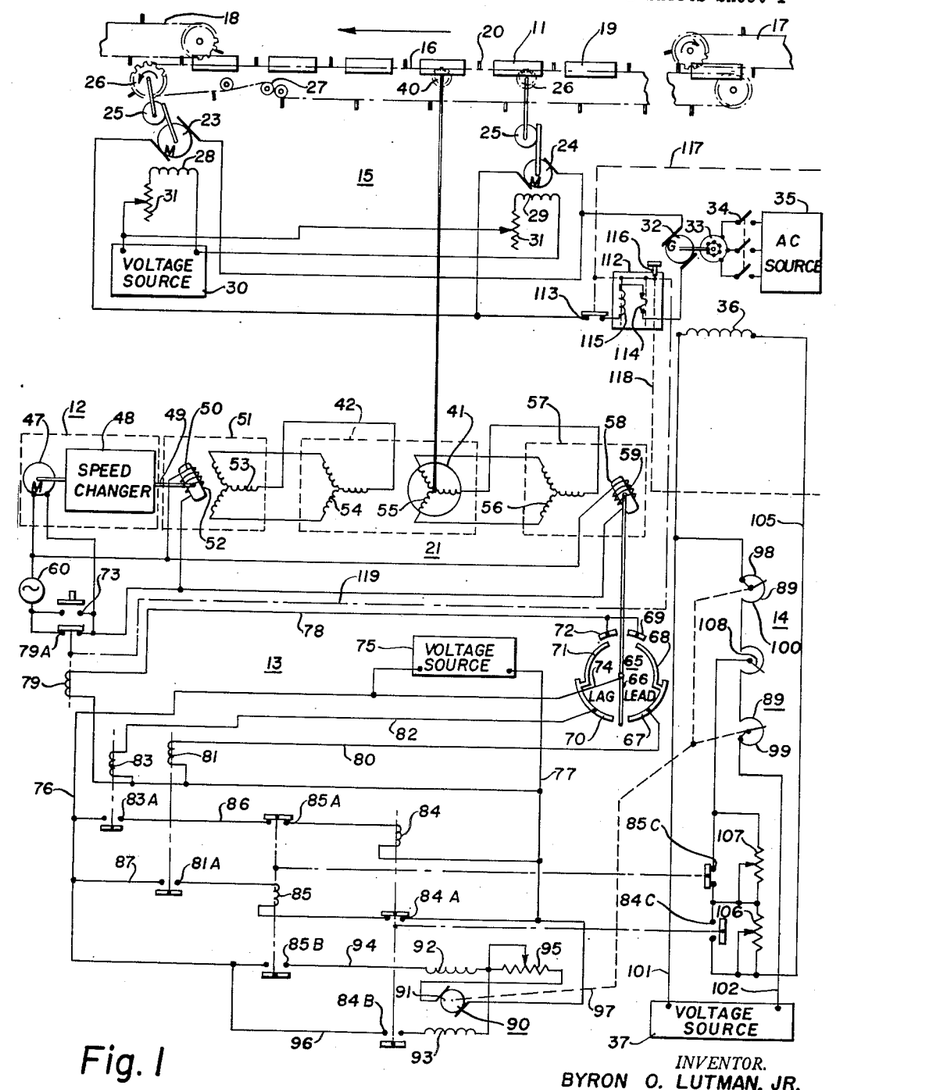
Figure 1 is a schematic diagram of a conveyor control system controlled by a master timer.

Figure 1 shows a conveyor system 11 as controlled in desired speed by a master timer 12 which operates through a control system 13 to control a variable speed means 14 acting on a motor drive system 15 which supplies the motive power for a conveyor 16 in the conveyor system 11. The conveyor system 11 also includes a supply conveyor 17 and a follower conveyor 18. Units 19 are carried on the conveyor system 11 with one unit per interval, with the interval being indicated as the distance between successive dogs 20. The units are moved from right to left on the conveyor system as shown in Figure 1 and move from the supply conveyor 17 to the master conveyor 16 and then on to the follower conveyor 18.

The motor drive system 15 may include one or more motors; and where the conveyor 16 is long and has many turns, inclines, or declines, it is customary to provide a plurality of drive motors. The Figure 1 shows two such drive motors 23 and 24. These have been shown as direct current motors which have good variable speed characteristics. The motors 23 and 24 drive through gear reducing drives 25 to gear wheels 26 on the master conveyor 16. A slack take up device 27 is also shown in the conveyor 16 to take up whatever slack may develop in this conveyor which conventionally is some form of a chain.

The drive motors 23 and 24 each have field windings 28 and 29 supplied with energization from any suitable source shown in Figure 1 as the voltage source 30. Variable resistances 31 are included in the circuit for each field for varying the speed of the motors 23 and 24 to assure that each of the several motors driving the conveyor 16, represented by motors 23 and 24, can be made to equally share the load.

The armatures of the drive motors 23 and 24 may be connected in parallel to a supply voltage source represented by a direct current generator 32. This generator is driven by a motive power source shown as an alternating current motor 33 energized through a switch 34 from a suitable alternating current source 35. The generator 32 has a field winding 36 which is a part of the variable speed means 14 because variations of energization on the field winding 36 will cause variable voltage output of the generator 32 to cause variable speeds of the motors 23 and 24. The field winding 36 may be energized directly from a voltage source 37 or may be energized from the armature of an exciter with the field winding of the exciter being supplied from this voltage source 37 as a power amplification means. The variable speed means 14 includes resistances which are capable of varying the energization supplied to the field winding 36. The variation of these resistances is controlled by the control system 13. The control system 13 is controlled jointly by the master timer 12 and by the conveyor 16 itself. This last mentioned connection includes a gear 40 driving the rotor 41 of a synchro differential 42. The gear 40 is driven by the conveyor 16 so that the rotor 41 has one revolution per interval or unit space. The synchro differential 42 compares the actual speed of the conveyor 16 with the speed of the master timer 12, which is the desired speed of the conveyor 16; and if there is any difference one way or the other, a signal is given to the control system 13 which, acting through the variable speed means 14, changes the speed of the conveyor 16 in either direction from a median speed.

The master timer 12 is a synchronizing motive power source which can be adjusted to run at any desired speed, and in this embodiment includes a small synchronous motor 47 driving a speed changer 48 which may include many sets of gears so that any desired speed of the output shaft 49 may be attained. The output shaft 49 drives the rotor 50 of a synchro generator 51 at a speed such that the rotor 50 rotates one complete revolution in a period of time equal to the period of time desired for successive dogs 20 to pass a fixed station. The synchro generator has a single-phase winding 52 on the rotor 50 and has a three-phase stator winding 53. The synchro differential 42 has a three-phase stator winding 54 and a three-phase rotor winding 55. The stator windings 53 and 54 are connected together and the three-phase rotor winding 55 is connected to a three-phase stator winding 56 of a synchro motor 57. This synchro motor 57 has a rotor 58 carrying a single-phase rotor winding 59. The single-phase rotor windings 52 and 59, as well as the synchronous timer motor 47, may be energized from any suitable alternating current source, such as the single-phase source 60.

Master timer 12 is a part of a synchronizer 21 which establishes the desired speed of the conveyor 16. This synchronizer 21 also includes the synchro differential 42 and, as in an ordinary differential, there are two inputs which are compared and the resultant supplied to an output. In this case one input comes from the master conveyor 16 through the gear 40 and the other input comes from the master timer 12 to the stator winding 54 with the output being supplied to the synchro motor 57.

The rotor 59 of the synchro motor 57 controls a double-throw switch 65 in the control system 13. This switch 65 has a movable contact blade 66 driven by the rotor 58 which may rotate in either direction from the null position shown. Upon movement in the lead direction, it may contact the contact segments 67, 68, and 69; and when moved in the lag direction, may contact the contact segments 70, 71, and 72. A voltage source 75 is shown for the control system 13 to supply energizing voltage to leads 76 and 77. The movable contact blade 66 is connected by a conductor 74 to the voltage source lead 76. The contact segments 69 and 72 are connected together and to a conductor 78 which leads to a shutdown relay 79 and then to the lead 77. The shutdown relay 79 has normally closed contacts 79A which may be bridged by a restart push button 73. The contact segments 67 and 68 are bridged together as are the contacts 70 and 71 in this circuit of Figure 1. A conductor 80 connects the segments 67 and 68 to a slow control relay 81 and then to the lead 77. Similarly, the contact segments 70 and 71 are connected by a conductor 82 to a fast control relay 83 and then to the lead 77. The control relays 81 and 83 each have normally open contacts 81A and 83A, respectively. The control system 13 also includes power relays controlled by the control relays 81 and 83, with these power relays being a faster relay 84 and a slower relay 85 each of which has a normally closed and a normally open contact noted by the suffix A and B, respectively. A conductor 86 extends from the lead 76 through the normally open contact 83A, the normally closed contact 85A, and through the faster relay 84 to the lead 77. A conductor 87 extends from the lead 76 through the normally open contact 81A, through the slower relay 85, and through the normally closed contact 84A to the lead 77.

A motor operated rheostat 89 is shown as a part of the variable speed means 14 and is driven by a motor 90 shown as part of the control system 13. The motor 90 has an armature 91 and two fields, one a slow down field 92 and the other a speed up field 93, with these fields wound in opposition to establish opposite rotational directions of the armature 91. The slow down field 92 is connected by a conductor 94 from the lead 76 through the normally open contacts 85B and through a variable resistance 95 through the armature 90 to the lead 77. The speed up field 93 is similarly connected by a conductor 96 through the normally open contacts 84B, through the variable resistance 95 and the armature 91 to the lead 77.

The output of the armature 91 is connected as shown at 97 to the ganged together rheostats 98 and 99 which comprise the motor operated rheostat 89. These rheostats 98 and 99 are serially connected with a manual rheostat 100 connected therebetween, then connected across leads 101 and 102 from the voltage source 37. The lead 101 also supplies directly one side of the generator field winding 36, and a conductor 105 is connected to the other side of the field winding 36 and leads through serially connected variable resistances 106 and 107 to the movable contact 108 on the manual rheostat 100. The variable resistances 106 and 107 are adapted to be shunted by contacts 84C and 85C, respectively, with these contacts operated by the faster and slower relays 84 and 85, respectively.

The motor drive system 15 includes a control relay means 112 which controls contacts 113 connected to interrupt the flow of current from the generator 32 to all drive motors for the conveyor 16. This control relay means 112 includes several devices, one of which is a thermal overload device 114 and another of which is an instantaneous overload device 115. Also, a manual control button 116 is supplied to manually interrupt the current to the drive motors. Interlocks 117 and 118 are also provided between the control relay means 112 and the conveyor control system of Figure 2 which is the control for the supply conveyor 17 later described. An interlock 119 also connects the control relay means 112 to the shutdown relay 79.

*Operation*

The conveyor control system of Figure 1 utilizes the master timer 12 to control the desired speed of the master conveyor 16. The master timer 12 establishes the output shaft 49 of the speed changer 48 at a speed which is one revolution for each interval of time desired for successive dogs 20 on the conveyor 16 to pass a fixed station. This means that one of the units 19 therefore passes such fixed station in one such interval of time. The rotor 50 of the synchro generator 51 therefore makes one revolution per unit space on the master conveyor 16. The drive motors 23 and 24 drive the conveyor 16 at a speed which is supposed to be equal to this desired speed of the conveyor. The rotor 41 of the synchro differential 42 is rotated directly in accordance with the actual speed of the conveyor 16, and thus the synchro differential 42 compares the electrical phase rotation on the stator 54 with the physical phase rotation of the rotor 55; and if these are in exact synchronism, then no electrical output is generated in the rotor windings 55 to be passed to the synchro motor 57. If the conveyor speed is too fast or too slow, then a three-phase voltage of one phase rotation or the other will be generated and passed to the synchro motor 57. This will, in combination with the voltage on the rotor winding 59, develop a torque in the rotor 58 to move the contact blade 66 in either the lead or the lag direction corresponding to whether the conveyor is leading or lagging its desired speed. For example, if the conveyor is leading, then the contact blade 66 moves counterclockwise, as viewed in Figure 1, to engage segment 67. This energizes the slow control relay 81 which in turn energizes the slower relay 85 to energize the slow down field 92 and start rotation of the motor operated rheostat 89. These rheostats move counterclockwise, as viewed in Figure 1, to increase the resistance thereof and thus decrease the energization to the generator field winding 36. This decreases the generated voltage output and slows down the motors 23 and 24. This thus is the speed regulating system.

Also incorporated in this circuit of Figure 1 is not only the speed regulating system above described but also a position regulating system. When the slower relay 85 is energized, this opens the normally closed contacts 85C to place in the field energization circuit the added resistance of the variable resistance 107. This changes the total resistance of the generator energization circuit in a relatively large increment to quickly slow down, as by a surge condition, the speed of the drive motors 23 and 24. This thus establishes a position regulating system because the conveyor is caused to make a relatively large change in speed to correct the position of the conveyor 16 at the same time that the motor operated rheostat 89 is being operated in relatively small increment per unit of time to gradually change the median speed setting of the motors 23 and 24.

When the conveyor has slowed down sufficiently to restore the contact blade 66 to its null position, then the control system 13 and variable speed means 14 is restored to the null or median speed condition shown in Figure 1.

Conversely, if the conveyor 16 is moving too rapidly, the contact blade 66 will be moved in a clockwise direction to engage the segment 70 which energizes the fast control relay 83 and the faster relay 84 to energize the speed up field 93 and drive the motor operated rheostat 89 in a clockwise direction. This decreases the total resistance in the generator field circuit to increase the speed of the motors 23 and 24 for a speed regulating system. Simultaneously, the faster relay contacts 84C are closed to shunt the variable resistance 106 and therefore by a surge condition considerably lessen the total resistance in the generator field circuit to definitely increase the motor speed by a relatively large increment for a position regulating system.

If the conveyor 16 for any reason is not corrected in its lead or lag conditions by the circuits mentioned above and the out of synchronism condition between the conveyor 16 and the master timer 12 continues to increase in either the lead or lag direction, then the contact blade 66 will eventually engage either the contact segment 69 or the segment 72. In either event the shutdown relay 79 will be energized which opens the contact 79A to interrupt energization to the synchronous timer motor 47 and also to both single-phase rotor windings 52 and 59, and through the interlock 119 to the control relay means 112. This interrupts current flow to the motors 23 and 24. When the condition which caused out of synchronism has been corrected, the contacts 113 may be reclosed by the manual control button 116 and the restart push button 73 has been shown as an illustrative means for restarting the master timer 12 to move the contact blade 66 off its former shutdown position in engagement with either of the contact segments 69 or 72.

Figure 2:
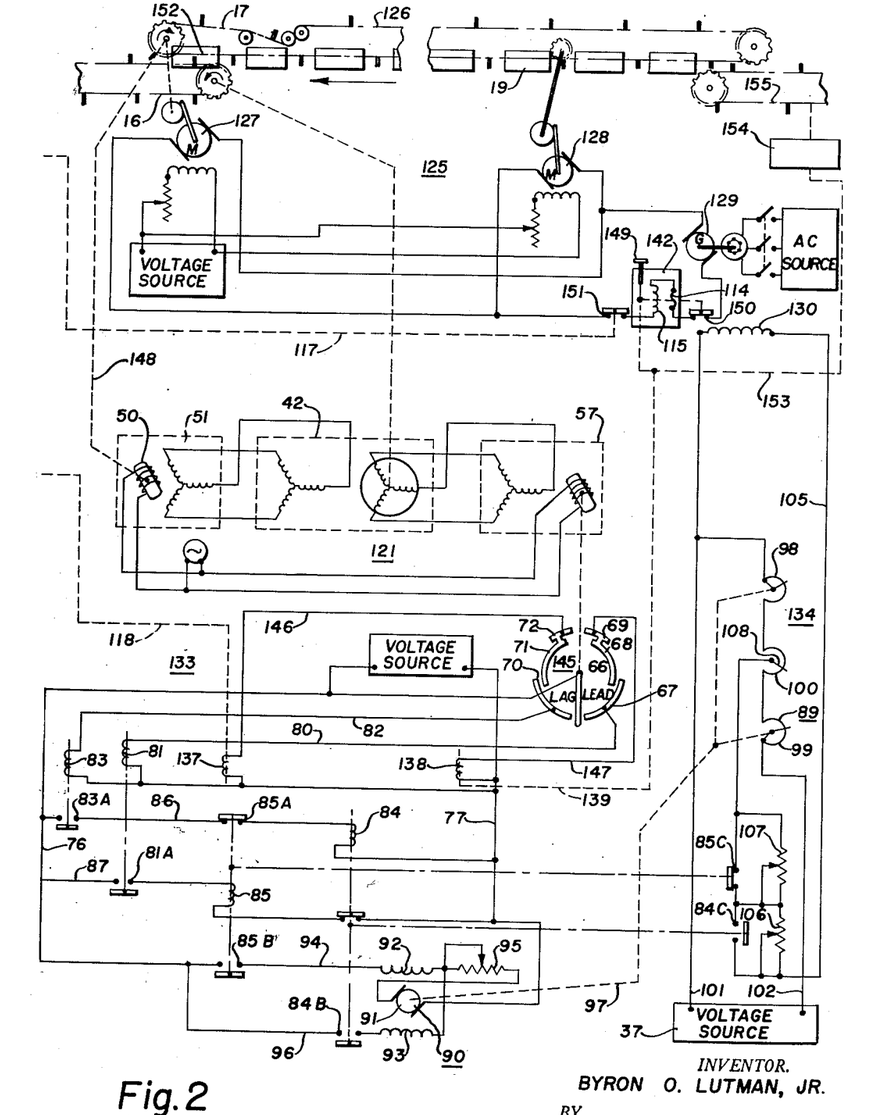
Figure 2 is a schematic diagram of another conveyor control system which may be a slave conveyor controlled by a master conveyor.

*Slave conveyor of Figure 2*

The Figure 2 shows a slave conveyor system 126 for the supply conveyor 17 which in this case is a conveyor slave to the movements of the master conveyor 16 partially shown in Figure 2 and principally shown with its control system in Figure 1. Units 19 are carried on the slave conveyor 17 to be passed to the master conveyor 16 and movement is from right to left as shown in this Figure 2. The slave conveyor 17 may be driven by one or a plurality of drive motors 127 and 128 which are part of a motor drive system 125 which may be the same in all essential particulars as the motor drive system 15 described for the circuit of Figure 1. This motor drive system 125 includes as the energizing source a generator 129 similar to generator 32 with this generator 129 having a field winding 130 supplied by a variable speed means 134, the same in essential particulars as the variable speed means 14 of Figure 1. The various components of the variable speed means 134 have been denoted by the same reference numerals as in the variable speed means 14 and is controlled by a slave control system 133 quite similar to the control system 13 of Figure 1. Similar parts of the two control systems have been denoted with the same reference numerals and the differences are that the slave control system 133 includes a follower conveyor relay 137 and a conveyor stop relay 138. The follower conveyor relay 137 is connected to the interlock 118 which leads to the control system for the master conveyor 16, and the conveyor stop relay 138 is interconnected, as shown by the connection 139, to a control relay means 142 in the motor drive system 125 which control relay means is similar to the control relay means 112 in Figure 1.

The slave control system 133 again includes a double-throw switch 145 similar to the double-throw switch 65 of Figure 1. The three sets of segments of the switch 145 are interconnected differently than in the switch 65, however, since in the switch 145 the segments 69 and 68 are interconnected as are the segments 71 and 72, yet the segments 67 and 68 are not interconnected nor are the segments 70 and 71. The contacts 71 and 72 of switch 145 are connected by a conductor 146 to the follower conveyor 137 and then to the lead 77. The contacts 68 and 69 are connected by a conductor 147 to the conveyor stop relay 138 and then to the lead 77.

The slave control system 133 is controlled by a synchronizer 121 which serves much the same function as the synchronizer 21 in Figure 1. This synchronizer 121 again includes the synchro generator 51, the synchro differential 42, and the synchro motor 57 with identical functions. The synchro differential 42 is again driven by the conveyor system and in fact has been shown as being driven by the master conveyor 16. The synchro generator 51, however, has the input 148 to the rotor 50 thereof connected to the slave conveyor 117. Thus the synchro differential 42 compares the speed at conveyors 16 and 17. This means that the speed of the slave conveyor 17 is compared to the speed of the master conveyor 16, and the torque output of the synchro motor 57 is responsible to any out of synchronism conditions whether lead or lag to move the contact blade 66 of the double-throw switch 145.

The control relay means 142 again includes the thermal overload device 114 and the instantaneous overload device 115 and includes a manual control button 149 so that this control relay means 142 controls energization to the drive motors by means of contacts 150. Contacts 151 are also connected in series with the contacts 150 and may be considered as part of the control relay means 142 and are connected by the interlock 117 to the control relay means 112 of the circuit of Figure 1.

*Operation*

The slave conveyor system 126 of Figure 2 through the slave control system 133 controls the speed of the slave or supply conveyor 17 in accordance with the speed of the master conveyor 16. Flow of material is from right to left with units on the slave conveyor 17 being passed to the master conveyor 16 at a transfer point 152. If the units 19 are carried on these conveyors by hooks, for example, then it is necessary that the hooks on the conveyor following transfer point be synchronized with the hooks on the conveyor supplying units to the transfer point so that the units will be transferred from one conveyor to the other without dropping the units off the conveyors. Naturally, some tolerance can be built into the mechanism effecting the transfer, and let us assume that this tolerance is a given distance which may be, for example, one-tenth or one-twentieth of a unit space between successive dogs 20 on the conveyors. This tolerance distance, as it may be called, is the maximum out of synchronism condition which can be tolerated and still have units on one conveyor successfully transferred to the next conveyor. This tolerance distance is calculated as a certain angular deviation of the contact blade 66 from the null position to the contact segments 68 or 71. This angular deviation has been shown as about seventy degrees either side of the null position, but this is not a limiting condition but merely illustrative.

If the conveyor 17 leads the master conveyor 16 through some condition, such as temporary shut down or slow down of a master conveyor, then the contact blade 66 will move counterclockwise, as shown in Figure 2 to engage contact segment 67. This will set into action a chain of events similar to that for the control system of Figure 1 with the slow control relay 81 and the slower relay 85 energized to operate the motor operated relay 89 and to control the resistance 107 so as to slow down the drive motors 127 and 128 for both speed and position regulation. Conversely, if the slave conveyor 17 lags for any reason, such as by temporary shut down or slow down of that conveyor itself, then the contact blade 66 moves clockwise to speed up the drive motors 127 and 128.

If the leading or lagging condition is not corrected by the blade 66 contacting the segments 67 or 70, respectively, because of any fault condition in the entire conveyor system, then the contact blade 66 will continue to move away from the null position until it contacts either the contact segment 68 or segment 71. If the master conveyor 16 is shut down for any reason, for example, as by an operation of the control relay means 112 in Figure 1, then through the interlock 117 this will also shut down the motor drive system 125 by opening the contacts 151. This is so units 19 do not continue to be piled up at the transfer point 152. If however through any other condition the slave conveyor 17 begins to lead the master conveyor 16 and the interlock 117 does not stop the motor drive system 125, then the contact blade 66 will engage segment 68. This energizes the conveyor stop relay 138 to operate the control relay means 142, opening contacts 150 to stop the motor drive system 125. Also suitable interlocks, such as that shown at 153, may lead to a control system 154 for a conveyor 155 which in turn is a supply conveyor for the conveyor 17 at a transfer point 156.

If the slave conveyor 17 begins to lead too much the master conveyor 16 for any reason, then the contact blade 66 will eventually engage segment 71 which energizes the follower conveyor relay 137, and this through the interlock 118 shuts down the motor drive system 15 of the master conveyor 16 until the slave conveyor 17 has a chance to catch up.

The synchronizers 21 and 121 of the systems of Figures 1 and 2 utilize differentials which compare the actual speed of the conveyor being controlled with the desired speed of some standard whether it be a master timer 12 or whether it is some other conveyor such as the master conveyor 16. The synchro units 42, 51, and 57 may be of small size, such as utilized for instrument synchros, and the torque output of the synchro motor 57 need be but very little because the movable contact blade 66 requires little input torque and controls only small control currents. This is the reason for utilizing the control relays 81 and 83 in cascade with the power relays 84 and 85 in order to have sufficient power amplification in order to control the motor operated rheostat 89. The double-throw switches 65 and 145 give selective energization to both the motor operated rheostat 89 for speed regulation in small increments per unit of time and to the resistances 106 and 107 which give large increments of energization change for position regulation means.

Figure 3:
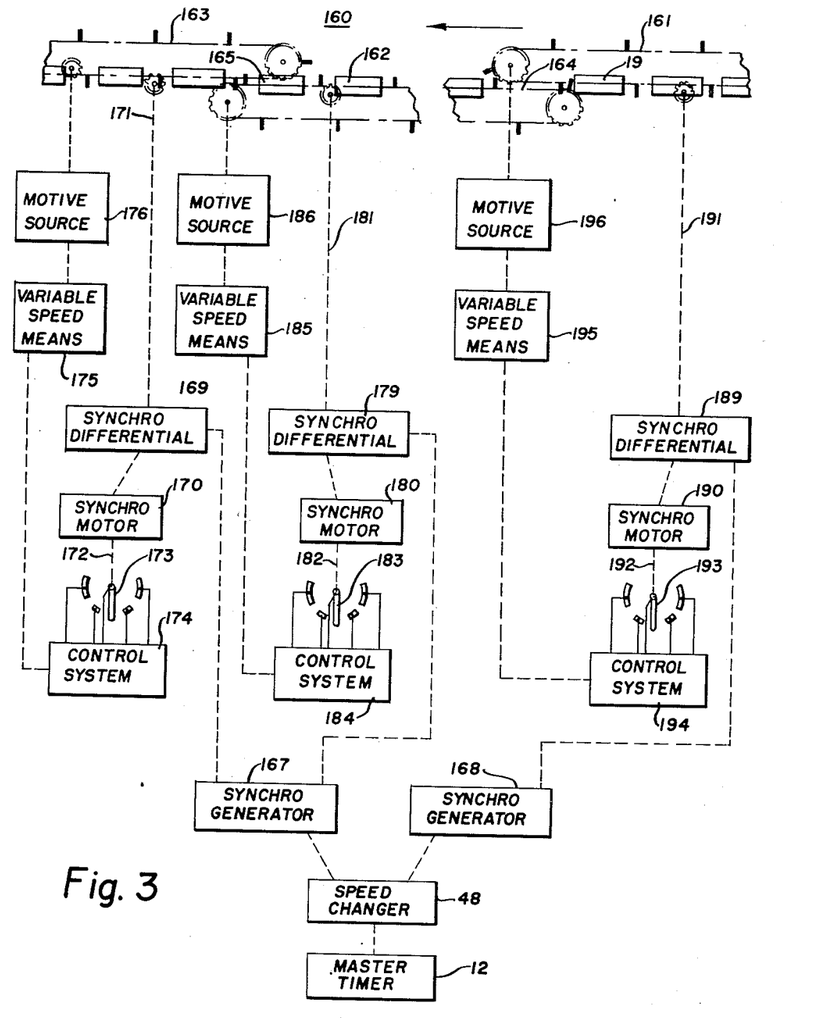
Figure 3 is a schematic block diagram showing a master timer controlling a plurality of conveyors serially connected in a conveyor system.

The Figure 3 shows another way to synchronize a plurality of conveyors in a conveyor system 160. This conveyor system includes first, second, and third conveyors 161, 162, and 163 again conveying the units 19 from right to left with the units being transferred between conveyors at transfer points 164 and 165. A master timer 12 is again used with a speed changer 48 to drive synchro generators 167 and 168. The synchro generator 167 is connected to a synchro differential 169 with this differential also being connected to a synchro motor 170. The synchro differential 169 is driven by an input 171 from the conveyor 163 at one revolution per unit space, and thus the synchro differential 169 compares the speed of the conveyor 163 with the speed of the synchro generator 167 which is the desired speed and thus controls the synchro motor 170. The synchro motor 170 has an output 172 to a double-throw control switch 173 which in turn controls a control system 174 to control a variable speed means 175 which in turn controls the speed of a motive source 176 driving the conveyor 163. It will thus be seen that this portion of the conveyor system 160 is similar to that described for Figure 1.

The synchro generator 167 also supplies energy to another synchro differential 179 having an input 181 from the conveyor 162, and thus this synchro differential 179 compares the speed of the conveyor 162 with the speed of the synchro generator 167 on the other input and the resultant is passed by the output of the differential 179 to a synchro motor 180. This motor 180 again controls a control system 184 through a double-throw control switch 183, and the control system 184 controls a variable speed means 185 in turn controlling a motive source 186 for the drive of the conveyor 162.

A synchro differential 189 has an input connected to the output of the synchro generator 168 and has another input 191 driven by the conveyor 161. The synchro differential 189 again compares both inputs and the resultant output is passed to a synchro motor 190. The output 192 of the synchro motor drives a double-throw control switch 193 to control a control system 194 in turn controlling a variable speed means 195 in turn controlling a motive source 196 for the drive of the conveyor 161.

The synchro generators 167 and 168 may be similar to the synchro generators 51 of Figures 1 and 2. Likewise, the synchro differentials 169, 179, and 189 are similar to the synchro differential 42; the synchro motors 170, 180, and 190 are similar to the synchro motor 57. Also the double-throw control switches 173, 183, and 193 are similar to the control switches 65 and 145 to control the control systems 174, 184, and 194 again similar in function and circuit connections to the control systems 13 and 133. Also, the various variable speed means 175 and 185 and 195 are counterparts of the variable speed means 14 and 134, with the motive sources 176, 186, and 196 being counterparts of the motor drive systems 15 and 125.

The master timer 12 may include a synchronous timer motor or other means for establishing a desired return of speed of the conveyor system 160. Since all conveyors 161, 162, and 163 are tied back to the master timer 12 for their synchronization, then all conveyors will be synchronized together. The synchro differentials 179 and 189 have been shown as being supplied by different synchro generators 167 and 168 to show that they may have separate voltage sources yet both controlled by the master timer 12. Alternatively, the synchro differentials 169 and 179 have been shown as both being supplied with three-phase voltage from the synchro generator 167 to show that one large synchro generator may be used to supply all synchro differentials in a particular conveyor control system.

The circuit of Figure 1 shows how a master control system may control a master conveyor 16, and Figure 2 is complementary to the circuit of Figure 1 to show how a slave conveyor 17 may be controlled by a master conveyor 16. In effect the slave conveyor 17 is also being controlled by the master timer 12 in the circuit of Figure 1 through the intermediate agency of the master conveyor control system. The Figure 3 shows a conveyor control system wherein all conveyors in the system are tied back too a single master timer through generally identical control paths. The conveyor control system shown in the combined Figures 1 and 2 has an advantage in that despite any change in length of the chain conveyors, such as due to wear on the chains, with consequent slight lengthening of the unit space for the units 19, still there is maintained direct synchronism between conveyors at a particular transfer point so that transfer of units from conveyor to conveyor will always be maintained at its optimum condition even though one conveyor chain has worn more than the other conveyor chain. Also, the circuits of Figures 1 and 2 show that the master conveyor may follow the slave conveyor or may itself supply to the slave conveyors, such as the follower conveyor 18, and therefore it will be seen that the master conveyor 16 may be placed anywhere in a conveyor system whether at one end or the other or somewhere in between.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A system for synchronizing the movements of first and second conveyors comprising a master timer motor, first means driven by said master timer motor at a preselected rate of rotation for a desired linear speed of said first conveyor, second means driven by said first conveyor directly in accordance with the actual linear speed of said first conveyor, first differential means having an output and having two inputs for comparing the relative speeds of said first and second means, first reversible motor means energized in accordance with the output of said first differential means, first double-throw switch means selectively actuated in accordance with the two directions of movement of said first motor means, first and second drive means for said first and second conveyors, respectively, means to vary in opposite directions from a given speed the speed of said first drive means in accordance with the selected switching of said first switch means, third means driven at a speed syncronized with that of said master timer motor, fourth means driven by said second conveyor directly in accordance with the actual linear speed of said second conveyor, second differential means having an output and having two inputs for comparing the relative speeds of said third and fourth means, second reversible motor means energized in accordance with the output of said second differential means, second double-throw switch means selectively actuated in accordance with the two directions of movement of said second motor means, and means to vary in opposite directions from a median the speed of said second drive means in accordance with the selected switching of said second switch means.

2. A system for synchronizing the movements of first and second conveyors comprising, a master timer motor, first means driven by said master timer motor at a preselected rate of rotation for a desired linear speed of said two conveyors, second means driven by said first conveyor directly in accordance with the actual linear speed of said first conveyor, first differential means having an output and having two inputs for comparing the relative speeds of said first and second means, first reversible motor means energized in accordance with the output of said first differential means, first double-throw switch means selectively actuated in accordance with the two directions of movement of said first motor means, first and second drive means for said first and second conveyors, respectively, means to vary the speed of said first drive means in opposite directions from a given speed in accordance with the selected switching of said first switch means, third means driven by said second conveyor directly in accordance with the actual linear speed of said second conveyor, second differential means having an output and having two inputs for comparing the relative speeds of said first and third means, second reversible motor means energized in accordance with the output of said second differential means, second double-throw switch means selectively actuated in accordance with the two directions of movement of said second motor means, and means to vary the speed of said second drive means in opposite directions from a median speed in accordance with the selected switching of said second switch means.

3. A synchronizing system for a conveyor, comprising, a synchronizer motive source, first means driven by said synchronizer motive source at a preselected rate of rotation for a desired linear speed of said conveyor, second means driven by said conveyor directly in accordance with the actual linear speed thereof, differential means having an output and having two inputs for comparing the relative speeds of said first and second means, reversible motor means energized in accordance with the output of said differential means, double-throw switch means actuated in accordance with the two directions of movement of said motor means, drive means for said conveyor, and means to vary in opposite directions from a given speed the speed of said drive means in accordance with the selected switching of said switch means.

4. A conveyor synchronizing system for first and second conveyors comprising, a master timer motor, first means driven by said master timer motor at a preselected rate of rotation for a desired linear speed of said first conveyor, second means driven by said first conveyor directly in accordance with the actual linear speed thereof, first differential means having an output and having two inputs for comparing the relative speeds of said first and second means, first reversible motor means energized in accordance with the output of said first differential means, first double-throw switch means actuated in accordance with the two directions of movement of said first motor means, first and second drive means for said first and second conveyors, respectively, means to vary in opposite directions from a given speed the speed of said first drive means in accordance with the selected switching of said first switch means to establish said first conveyor at said desired linear speed, third means driven by said first conveyor directly in accordance with the linear speed thereof, fourth means driven by said second conveyor directly in accordance with the linear speed thereof, second differential means having an output and having two inputs for comparing the relative speeds of said third and fourth means, second reversible motor means energized in accordance with the output of said second differential means, second double-throw switch means selectively actuated in accordance with the two directions of movement of said second motor means, and means to vary in opposite directions from a median speed the speed of said second drive means in accordance with the selected switching of said second switch means to establish said second conveyor at the speed of said first conveyor.

5. A control device for a conveyor, comprising, a motor to drive said conveyor, speed varying means for said motor, a synchronizing power source, a differential having first and second inputs and an output, means for driving said first differential input from said synchronizing power source at one revolution per interval with the interval being the desired length of time for successive units on said conveyor to pass a fixed station, means for driving said second differential input from said conveyor at one revolution for each period of time required for successive units to pass said fixed station, a double-throw control switch having first and second contacts selectively controlled by either direction of rotation of said differential output, a motor operated rheostate connected to vary said speed varying means in small increments per unit of time, means controlled by said first and second contacts of said switch to effect selected rotation of said motor operated rheostat, and means for increasing and decreasing said speed varying means in relatively large increments upon actuation of said first and second contacts, respectively.

6. A control device for a conveyor, comprising a motor to drive said conveyor, speed varying means for said motor, a timer motor, a speed changing device driven from said timer motor, a differential having first and second inputs and an output, means for driving said first differential input from said speed changing device at one revolution per interval with the interval being the desired length of time for successive units on said conveyor to pass a fixed station, means for driving said second differential input from said conveyor at one revolution for each period of time required for successive units to pass said fixed station, a double-throw control switch having first and second contacts selectively controlled by either direction of rotation of said differential output, a motor operated rheostat connected to vary said speed varying means in small increments per unit of time, means controlled by said first and second contacts of said switch to effect selected rotation of said motor operated rheostat, and means for increasing and decreasing said speed varying means in relatively large increments upon actuation of said first and second contacts, respectively.

7. A control device for a conveyor, comprising, a direct current motor to drive said conveyor, a direct current generator operable from a motive power source and having a field winding and adapted for energizing said direct current motor, field energization means for said field winding, a synchronizing power source, a synchro generator having a single-phase rotor winding and a three-phase rotor winding, a synchro differential having a three-phase stator winding and a three-phase rotor winding, a synchro motor having a three-phase stator winding and a single-phase rotor winding, means for electrically connecting together a three-phase winding of each of said synchro generator and differential, means for electrically connecting the other three-phase winding of the synchro differential to the stator winding of the synchro motor, means for connecting both said single-phase rotor windings to an alternating current source, means for mechanically driving the rotor of one of said synchro differential and synchro generator from said synchronizing power source at one revolution per interval with the interval being the desired length of time for successive units on said conveyor to pass a fixed station, means for mechanically driving the rotor of the other of said synchro differential and synchro generator from said conveyor at one revolution for each period of time required for successive units to pass said fixed station, a single-pole double-throw control switch selectively controlled by either direction of rotation of said rotor of said synchro motor, first and second relays controlled by the two contacts of said switch, a motor operated rheostat connected to vary the energization to said generator field winding in small increments per unit of time, means controlled by said first and second relays to effect selected rotation of said motor operated rheostat, and means for increasing and decreasing the energization to said field winding in relatively large increments upon energization of said first and second relays, respectively.

8. A control device for a conveyor, comprising, a motor to drive said conveyor, speed varying means for said motor, a timer motor, a speed changing device driven from said timer motor, a synchro generator having a single-phase rotor winding and a three-phase rotor winding, a synchro differential having a three-phase stator winding and a three-phase rotor winding, a synchro motor having a three-phase stator winding and a single-phase rotor winding, means for electrically connecting together a three-phase winding of each of said synchro generator and differential, means for electrically connecting the other three-phase winding of the synchro differential to the stator winding of the synchro motor, means for connecting both said single-phase rotor windings to an alternating current source, means for mechanically driving the rotor of one of said synchro differential and synchro generator from said speed changing device at a given number of revolutions per interval with the interval being the desired length of time for successive units on said conveyor to pass a fixed station, means for mechanically driving the rotor of the other of said synchro differential and synchro generator from said conveyor at said given number of revolutions for each period of time required for successive units to pass said fixed station, a double-throw control switch having first and second contacts selectively controlled by either direction of rotation of said rotor of said synchro motor, a motor operated electrical device connected to vary said speed varying means in small increments per unit of time, means controlled by said first and second contacts of said switch to effect selected rotation of said motor operated electrical device, and means for increasing and decreasing said speed varying means in relatively large increments upon actuation of said first and second contacts, respectively.

9. A control device for a conveyor for moving a predetermined number of units past a fixed station per unit of time, comprising, a motor to drive said conveyor, speed varying means for said motor, a timer motor, means for energizing said timer motor from a voltage source, a gear changing device driven from said timer motor, a synchro generator having a single-phase rotor winding and a three-phase rotor winding, a synchro differential having a three-phase stator winding and a three-phase rotor winding, a synchro motor having a three-phase stator winding and a single-phase rotor winding, means for electrically connecting together a three-phase winding of each of said synchro generator and differential, means for electrically connecting the other three-phase winding of the synchro differential to the stator winding of the synchro motor, means for connecting both said single-phase rotor windings to an alternating current source, means for mechanically driving the rotor of one of said synchro differential and synchro generator from said gear changing device at one revolution per interval with the interval being the desired length of time for successive units on said conveyor to pass said fixed station, means for mechanically driving the rotor of the other of said synchro differential and synchro generator from said conveyor at one revolution for each period of time required for successive units to pass said fixed station, a double-throw control switch selectively controlled by either direction of rotation of said rotor of said synchro motor, first and second relays controlled by the two contacts of said switch, a motor operated rheostat connected to vary said speed varying means in small increments per unit of time, means controlled by said first and second relays to effect selected rotation of said motor operated rheostat, and means for increasing and decreasing said speed varying means in relatively large increments upon energization of said first and second relays, respectively.

10. A control device for a conveyor for moving a predetermined number of units past a fixed station per unit of time despite temporary shut downs or interruptions of movement, comprising, a direct current motor to drive said conveyor, a direct current generator operable from a motive power source and having a field winding and adapted for energizing said direct current motor, field energization means for said field winding, a synchronous timer motor, means for energizing said synchronous timer motor from an alternating current source, a gear changing device driven from said synchronous timer motor, a synchro generator having a single-phase rotor winding and a three-phase rotor winding, a synchro differential having a three-phase stator winding and a three-phase rotor winding, a synchro motor having a three-phase stator winding and a single-phase rotor winding, means for electrically connecting together a three-phase winding of each of said synchro generator and differential, means for electrically connecting the other three-phase winding of the synchro differential to the stator winding of the synchro motor, means for connecting both said single-phase rotor windings to said alternating current source, means for mechanically driving the rotor of one of said synchro differential and synchro generator from said gear changing device at one revolution per interval with the interval being the desired length of time for successive units on said conveyor to pass said fixed station, means for mechanically driving the rotor of the other of said synchro differential and synchro generator from said conveyor at one revolution for each period of time required for successive units to pass said fixed station, a single-pole double-throw control switch selectively controlled by either direction of rotation of said rotor of said synchro motor, first and second relays controlled by the two contacts of said switch, a motor operated rheostat connected to vary the energization to said generator field winding in small increments per unit of time, means controlled by said first and second relays to effect selected rotation of said motor operated rheostat, and means for increasing and decreasing the energization to said field winding in relatively large increments upon energization of said first and second relays, respectively.

11. A control device for a conveyor for moving a predetermined number of units past a fixed station per unit of time despite temporary shut downs or interruptions of movement, comprising, a direct current motor to drive said conveyor, a direct current generator operable from a motive power source and having a field winding and adapted for energizing said direct current motor, field energization means for said field winding, a synchronous timer motor, means for energizing said synchronous motor from an alternating current source, a gear changing device driven from said synchronous motor, a generator synchro having a single-phase rotor driven from said gear changing device at one revolution per interval with the interval being the desired length of time for successive units on said conveyor to pass said fixed station, a three-phase stator on said generator synchro, a differential synchro driven in accordance with said conveyor at one revolution for each period of time required for successive units to pass said fixed station, said differential synchro having a three-phase stator and a three-phase rotor, a synchro motor having a three-phase stator and a single-phase rotor, means for electrically connecting together the stators of said generator and differential synchros, means for electrically connecting the rotor of the differential synchro to the stator of the synchro motor, means for connecting both said single-phase rotors to said alternating current source, a single-pole double-throw control switch selectively controlled by either direction of rotation of said rotor of said synchro motor, first and second relays controlled by the two contacts of said switch, a motor operated rheostat connected to vary the energization to said generator field winding in small increments per unit of time, means controlled by said first and second relays to effect selected rotation of said motor operated rheostat, and means for increasing and decreasing the energization to said field winding in relatively large increments upon energization of said first and second relays, respectively.

12. A synchronizing system for a machine, comprising, a synchronizer motive source, first means driven by said synchronizer motive source at a preselected rate for a desired speed of said machine, second means driven by said machine directly in accordance with the actual speed thereof, differential means having an output and having two inputs for comparing the relative speeds of said first and second means, reversible motor means energized in accordance with the output of said differential means, double-throw switch means actuated in accordance with the two directions of movement of said motor means, drive means for said machine, and means to vary in opposite directions from a given speed the speed of said drive means in accordance with the selected switching of said switch means.

13. A synchronizing system for a conveyor, comprising, a synchronizer motive source, first means driven by said synchronizer motive source at a preselected rate of rotation for a desired linear speed of said conveyor, second means driven by said conveyor directly in accordance with the actual linear speed thereof, differential means having an output and having two inputs for comparing the relative speeds of said first and second means, motor means energized in accordance with the output of said differential means, switch means actuated in accordance with movement of said motor means, drive means for said conveyor, and means to vary from a given speed the speed of said drive means in accordance with actuation of said switch means.

14. A conveyor synchronizing system for first and second conveyors, comprising, a synchronizer motive source, first differential means for comparing the relative speeds of said synchronozer motive source and said first conveyor, first reversible motor means energized in accordance with the output of said first differential means, first double-throw switch means actuated in accordance with the two directions of movement of said first motor means, first and second drive means for said first and second conveyors, respectively, means to vary in opposite directions from a given speed the speed of said first drive means in accordance with the selected switching of said first switch means to establish said first conveyor at said desired speed, third means driven at a speed synchronized with that of said synchronizer motive source, second differential means for comparing the relative speeds of said third means and said second conveyor, second reversible motor means energized in accordance with the output of said second differential means, second double-throw switch means selectively actuated in accordance with the two directions of movement of said second motor means, and means to vary in opposite directions from a median speed the speed of said second drive means in accordance with the selected switching of said second switch means.

15. A control device for a machine, comprising, a motor to drive said machine, speed varying means for said motor, a synchronizing motive source, a differential having first and second inputs and an output, means for driving said first differential input from said synchronizing motive source at a preselected rate, means for driving said second differential input from said machine in accordance with the actual speed thereof, a double-throw switch selectively actuated by either direction of rotation of said differential output, a motor operated rheostat connected to vary said speed varying means in small increments per unit of time, means controlled by the selected actuation of said switch to effect selected rotation of said motor operated rheostat, and means for increasing and decreasing said speed varying means in relatively large increments upon selected actuation of said switch.

16. A control device for a conveyor, comprising, a motor to drive said conveyor, a synchronizing motive source, a differential having first and second inputs and an output, means for driving said first differential input from said synchronizing motive source at a preselected rate for a desired speed of said conveyor, means for driving said second differential input from said conveyor in accordance with the actual speed thereof, a double-throw switch selectively actuated by either direction of rotation of said differential output, a speed regulating system for said motor controlled by the selective actuation of said switch to vary the speed of said conveyor in relatively small increments per unit of time, and a position regulating system for said motor also controlled by the selective actuation of said switch to vary the position of said conveyor in relatively large increments per unit of time.

17. A conveyor synchronizing system for first and second conveyors, comprising, a master timer motor, first means driven by said master timer motor at a preselected rate of rotation for a desired linear speed of said first conveyor, second means driven by said first conveyor directly in accordance with the actual linear speed thereof, first differential means having an output and having two inputs for comparing the relative speeds of said first and second means, first motor means energized in accordance with the output of said first differential means, first switch means actuated in accordance with movement of said first motor means, first and second drive means for said first and second conveyors, respectively, means to vary from a given speed the speed of said first drive means in accordance with the switching of said first switch means to establish said first conveyor at said desired linear speed, third means driven by said first conveyor directly in accordance with the linear speed thereof, fourth means driven by said second conveyor directly in accordance with the linear speed thereof, second differential means having an output and having two inputs for comparing the relative speeds of said third and fourth means, second motor means energized in accordance with the output of said second differential means, second switch means actuated in accordance with movement of said second motor means, and means to vary from a median speed the speed of said second drive means in accordance with the switching of said second switch means to establish said second conveyor at the speed of said first conveyor.

References Cited in the file of this patent

UNITED STATES PATENTS

| 2,076,202 | Lewellen et al. | Apr. 6, 1937 |
| 2,117,484 | Lewellen et al. | May 17, 1938 |
| 2,625,257 | Schenk | Jan. 13, 1953 |

FOREIGN PATENTS

| 718,147 | Great Britain | Nov. 10, 1954 |